US010613846B2

(12) United States Patent
Kulkarni et al.

(10) Patent No.: US 10,613,846 B2
(45) Date of Patent: Apr. 7, 2020

(54) BINARY RESTORATION IN A CONTAINER ORCHESTRATION SYSTEM

(71) Applicant: INTERNATIONAL BUSINESS MACHINES CORPORATION, Armonk, NY (US)

(72) Inventors: Shrinivas Kulkarni, Bangalore (IN); Siba Prasad Satapathy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 15/952,427

(22) Filed: Apr. 13, 2018

(65) Prior Publication Data

US 2019/0317747 A1 Oct. 17, 2019

(51) Int. Cl.
*G06F 8/61* (2018.01)
*H04L 29/08* (2006.01)

(52) U.S. Cl.
CPC .................. *G06F 8/61* (2013.01); *G06F 8/62* (2013.01); *H04L 67/34* (2013.01)

(58) Field of Classification Search
CPC .................. G06F 8/61; G06F 8/62; G06F 8/60
See application file for complete search history.

(56) References Cited

U.S. PATENT DOCUMENTS

| 6,374,401 | B1 * | 4/2002 | Curtis ........................ G06F 8/61 707/999.202 |
| 8,645,672 | B2 * | 2/2014 | Attanasio ............ G06F 9/44505 713/1 |
| 9,323,519 | B2 * | 4/2016 | Faus ........................ G06F 8/658 |
| 9,760,443 | B2 | 9/2017 | Tarasuk-Levin et al. |
| 2001/0029605 | A1 * | 10/2001 | Forbes ....................... G06F 8/61 717/170 |
| 2003/0005037 | A1 * | 1/2003 | Aija .......................... G06F 8/61 709/203 |
| 2003/0220883 | A1 * | 11/2003 | Block ....................... G06F 21/10 705/59 |
| 2004/0045000 | A1 * | 3/2004 | Hara ......................... G06F 8/61 717/178 |
| 2004/0148184 | A1 * | 7/2004 | Sadiq .................. G06F 9/44505 717/171 |
| 2006/0123414 | A1 * | 6/2006 | Fors .......................... G06F 8/61 717/177 |
| 2007/0174832 | A1 * | 7/2007 | Brehm ....................... G06F 8/61 717/174 |
| 2007/0271552 | A1 * | 11/2007 | Pulley ..................... G06F 9/453 717/120 |
| 2008/0127169 | A1 * | 5/2008 | Malasky ................... G06F 8/61 717/174 |
| 2013/0067459 | A1 * | 3/2013 | Sannidhanam ........... G06F 8/61 717/176 |

(Continued)

*Primary Examiner* — Phillip H Nguyen
(74) *Attorney, Agent, or Firm* — Conley Rose, P.C.

(57) ABSTRACT

The disclosed embodiments include a system, computer program product, and computer-implemented method configured to restore binaries of a container. In one embodiment, the computer-implemented method receives a container install request to install a container on a host system. The computer-implemented method determines binaries that were previously installed with the container. The computer-implemented method installs the container and the binaries that were previously installed with the container in response to the container install request.

20 Claims, 8 Drawing Sheets

(56) References Cited

U.S. PATENT DOCUMENTS

| | | | |
|---|---|---|---|
| 2014/0180961 A1* | 6/2014 | Hankins | G06Q 10/10 |
| | | | 705/348 |
| 2016/0291952 A1* | 10/2016 | Velasco | G06F 8/61 |
| 2017/0199770 A1 | 7/2017 | Peteva et al. | |
| 2017/0235649 A1 | 8/2017 | Shah et al. | |
| 2017/0255462 A1* | 9/2017 | Azagury | G06F 8/76 |
| 2018/0052682 A1* | 2/2018 | Fox | G06F 8/751 |
| 2018/0285210 A1* | 10/2018 | Mitkar | G06F 8/63 |

* cited by examiner

BINARY RESTORATION IN A CONTAINER ORCHESTRATION SYSTEM

BACKGROUND

The present disclosure relates generally to containers and orchestration systems. In particular, the present disclosure relates to systems and methods for restoring binaries in a container.

A container is a lightweight, stand-alone, executable package of a piece of software that includes everything that is needed for it to run. For example, a container may include instruction code, runtime, system tools, system libraries, and settings. Containers are an abstraction at the application layer. The same kernel and libraries may be shared between multiple containers running on a host system. In contrast to containers, virtual machines (VMs) are an abstraction of physical hardware turning one server into many servers. Each instance of VM must contain an entire operating system, all required libraries, and the actual application binaries. VMs typically require several gigabytes (GBs) of storage and are slow to boot, whereas containers typically are several megabytes (MBs) in size and start almost instantly. Thus, the use of containers has transformed the industry in software application development, packaging, and management.

SUMMARY

The disclosed embodiments include a computer-implemented method performed by a system for restoring binaries in a container. In one embodiment, the computer-implemented method receives a container install request to install a container on a host system. The computer-implemented method determines binaries that were previously installed with the container. The computer-implemented method installs the container and the binaries that were previously installed with the container in response to the container install request.

The disclosed embodiments include a system configured to restore binaries in a container. The system includes memory for storing instructions, and a processor configured to execute the instructions to receive a container install request to install a container on a host system, determine binaries that were previously installed with the container, and install the container and the binaries that were previously installed with the container in response to the container install request.

The disclosed embodiments include a computer program product comprising a computer readable storage medium having program instructions embodied therewith, the program instructions executable by a processor. Executing the program instructions causes the processor to receive a container install request to install a container on a host system, determine binaries that were previously installed with the container, and install the container and the binaries that were previously installed with the container in response to the container install request.

Other embodiments and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

As referenced herein, the term database or knowledge base is defined as collection of structured or unstructured data. Although referred to in the singular form, the database may include one or more databases, and may be locally stored on a system or may be operatively coupled to a system via a local or remote network.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a unit may also refer to a particular set of functions, software instructions, or circuitry that is configured to perform a specific task.

Also, as used herein, the term "communicatively coupled" means capable of sending and/or data over a communication link. The communication link may include both wired and wireless links, and may be a direct link or may comprise of multiple links passing through one or more communication network devices such as, but not limited to, routers, firewalls, servers, and switches. The network device may be located on various types of networks such as local-area networks (LANs), wide-area networks (WANs), and metropolitan-area networks (MANs). The networks may include private networks and/or public networks such as the Internet. Additionally, in certain embodiments, communication links may also encompass internal communication between various components of a system and/or with an external input/output device such as a keyboard or display device.

The present disclosure relates generally to containers and orchestration systems. In particular, the present disclosure relates to systems and methods for restoring binaries in a container. As stated above, containers are an abstraction at the app layer that packages code and dependencies together, but the same kernel and libraries may be shared between multiple containers running on a host system. There are many advantages for using containers for application development. For example, when the application consists of multiple containers with clear interfaces between them, it is a simple and low-risk matter to update a container, assess the impact, and then either revert to the old version or roll the update out across similar containers. By having multiple containers provide the same capability, upgrading each container can be done without negatively affecting service. Additionally, by containerizing the application platform and its dependencies, differences in operating system (OS) distributions and underlying infrastructure are abstracted away. A base container may be customized by adding additional binary packages to the base container. For example, a particular user may create or add one or more pre-made binary packages to a container to add additional functions that are not available with the base image of a container. The problem is that containers are often designed to be short-lived and are frequently moved from one host system to another for any number of reasons. Containers may also be uninstalled and reinstalled on the same host system for any number of reasons such as a container malfunctioning or if a new version of the container is being pushed out to update or fix an error in the container. This means that a user must manually determine all the changes that were made to the container prior to being re-installed and go through the process of reinstalling all the customized binary packages. This process may be tedious, time intensive, and introduce errors.

Accordingly, the disclosed embodiments include a system, computer program product, and computer-implemented method configured to restore binaries of a container. In one embodiment, the computer-implemented method receives a container install request to install a container on a host system. The computer-implemented method determines binaries that were previously installed with the container. The computer-implemented method installs the container and the binaries that were previously installed with the container in response to the container install request.

The disclosed embodiments have significant advantages over current art. As an example, the disclosed embodiments enable containers to be automatically restored to its previous state when it is being recreated in response to the container being moved, updated, and/or restarted. The disclosed embodiments eliminate the need for a user to re-customize a container to serve a particular purpose, thus saving a tremendous amount of time and money. Additionally, the disclosed embodiments reduce run-time network dependencies/failures by storing a copy of the packages of the container locally, thus reducing network bandwidth and further increasing the speed of restoration of a container.

Figure 1:
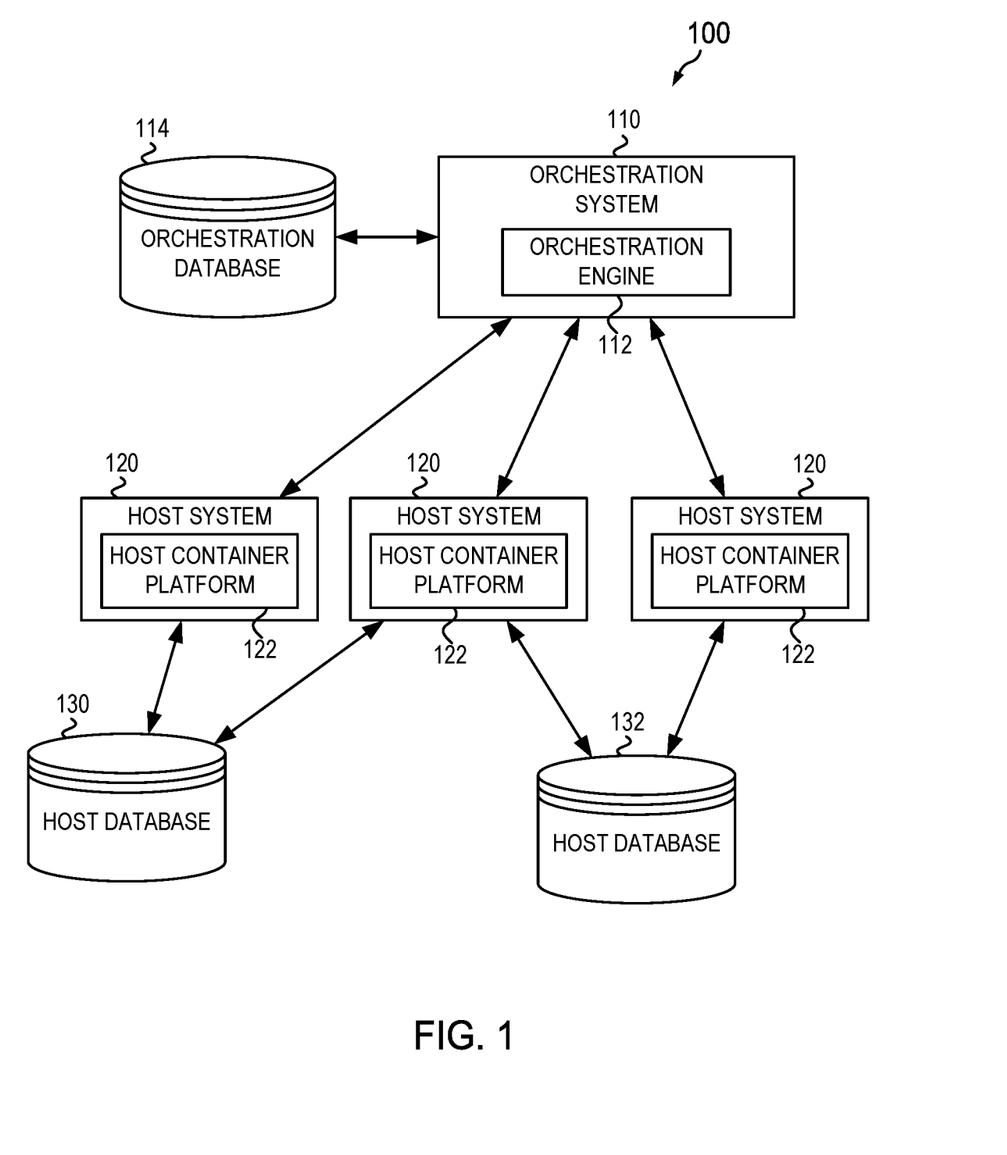
FIG. 1 is a block diagram illustrating an orchestration network architecture according to an embodiment of the present disclosure.

FIG. 1 is a block diagram illustrating an orchestration network architecture 100 according to an embodiment of the present disclosure. The orchestration network architecture 100 may operate across one or more public, private, and/or hybrid clouds. In the depicted embodiment, the orchestration network architecture 100 includes an orchestration system 110 that is communicatively coupled to one or more host systems 120. The orchestration system 110 includes an orchestration engine 112. An example of an orchestration engine 112 is International Business Machines (IBM)® Cloud Orchestrator and Kubernetes, which was developed by Google®. The host systems 120 each include a host container platform 122. The orchestration engine 112 on the orchestration system 110 communicates with the host container platform 122 for managing applications that utilize containers on the host systems 120. For example, the orchestration engine 112 may be configured to monitor the status of containers on the host systems 120 through the host container platform 122, and provision, deploy or start, stop, monitor performance, move a container, or assign resources to a container. The orchestration system 110 may be communicatively coupled to one or more databases such as orchestration database 114. Additionally, the host systems 120 may each be communicatively coupled to one or more databases such as a host database 130 and host database 132.

The orchestration database 114, host database 130, and host database 132 may include containers, packages, libraries, configuration files, application binaries, operating system, and other files. As stated above, a container is a lightweight, stand-alone, executable package of a piece of software that includes everything needed to run it including code, runtime, system tools, system libraries, settings. A package as referenced herein is a collection of binaries of software, configuration files, and information about dependencies. A package may be used to customize a particular container. For example, one or more packages may be used to add a particular feature or function to a base container. A binary is a file that contains computer-readable code in binary format or machine-code, as opposed to source code in text format. A non-limiting example of a binary is an application package that contains pre-compiled binaries of software, configuration files, libraries, and information about dependencies. A library is a group of functions usable by various programs. Pre-compiled means that that source code has been compiled by a compiler program and converted to binary format.

Figure 2:
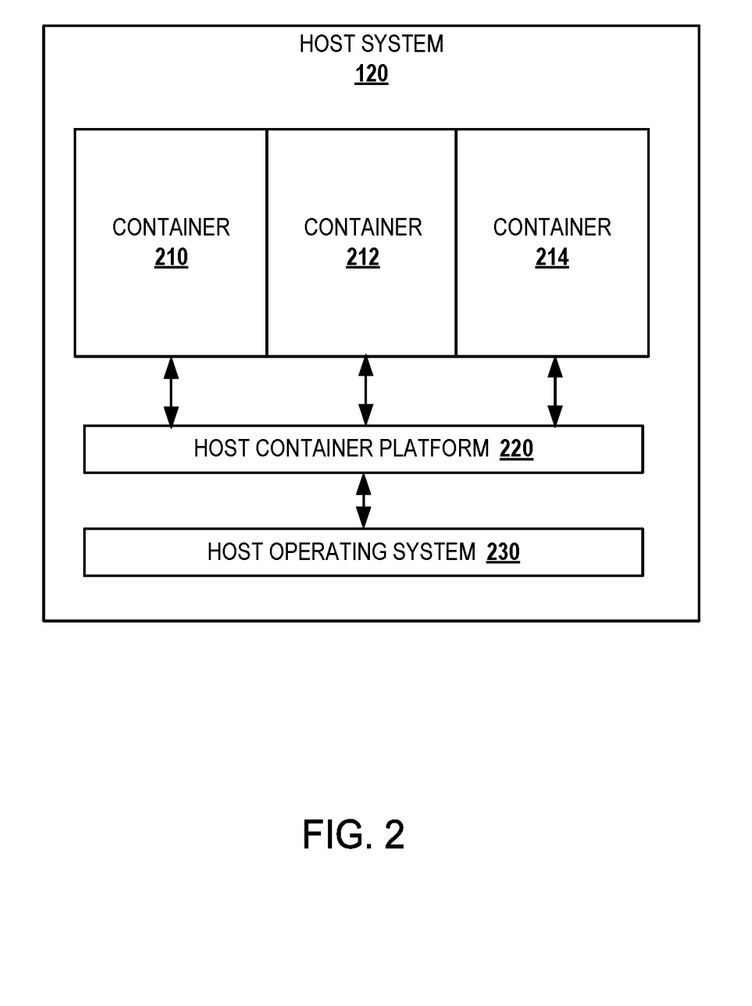
FIG. 2 is a block diagram illustrating a software architecture of a host system according to an embodiment of the present disclosure.

FIG. 2 is a block diagram illustrating a software architecture of the host system 120 according to an embodiment of the present disclosure. In the depicted embodiment, the host system 120 includes containers 210, 212, and 214. Although, three containers are depicted, the host system 120 may include any number of containers. The containers 210, 212, and 214 are managed by a host container platform 220. The host container platform 220 in conjunction with a host operating system 230 manages system resources for the containers such as provisioning storage or processing resources. The host container platform 220 may also be configured to build, deploy, or manage an application using one or more of the containers. The host operating system 230 may provide common services for the container 210, container 212, and container 214.

Figure 3:
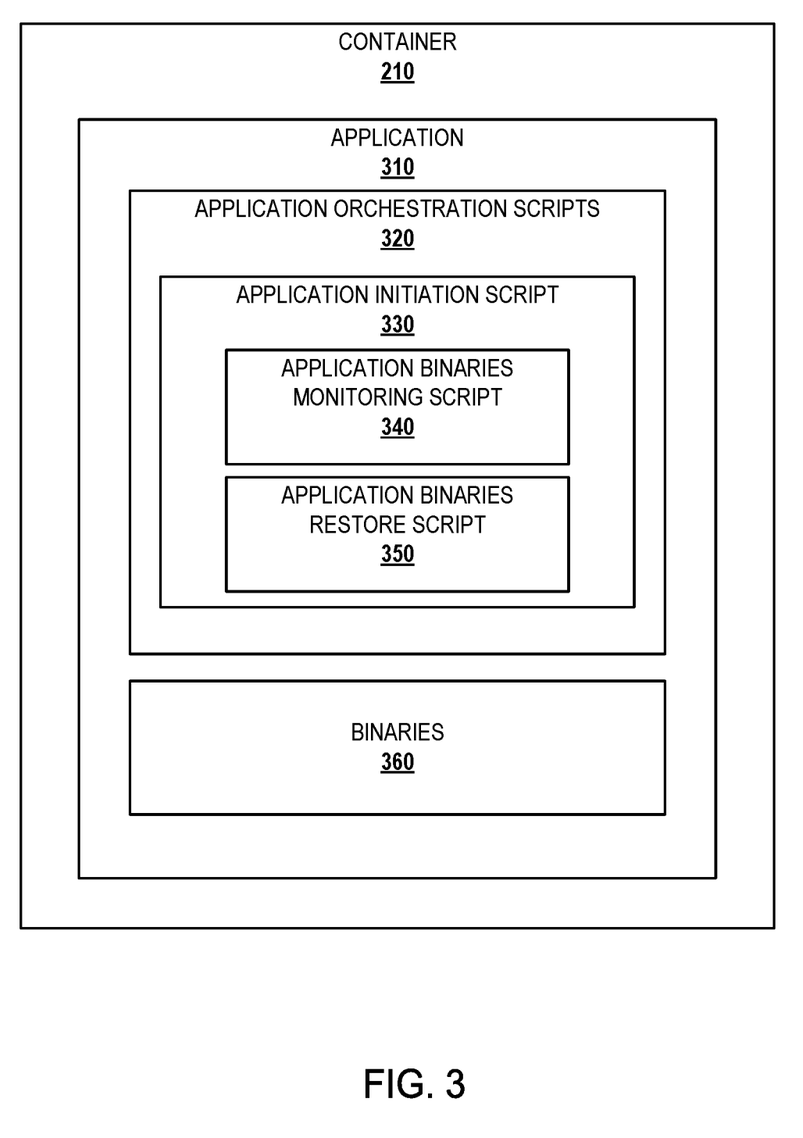
FIG. 3 is a block diagram illustrating a software architecture of a container according to an embodiment of the present disclosure.

FIG. 3 is a block diagram illustrating a software architecture of the container 210 according to an embodiment of the present disclosure. Containers 212 and 214 may be similarly configured. The container 210 includes an application 310. The application 310 may be any type of software application. For example, the application 310 may be an investment tool application that enables a user to buy and sell securities. The application 310 may include one or more application orchestration scripts 320 and binaries 360. The binaries 360 may include executable code, configuration files, libraries, etc. The application orchestration scripts 320 may include scripts that are executed by the host container platform 122 for managing, executing, and/or monitoring the application 310. The application 310 may include an application initiation script 330 that is configured to initiate or startup the application 310. The application initiation script 330 may be executed when the application is first installed on a host system and/or during a boot-up process of the host system. In accordance with an embodiment, the application initiation script 330 may initiate an application binaries monitoring script 340 that is configured to monitor changes made to the container 210. For example, the application binaries monitoring script 340 may be configured to monitor for the addition and/or removal of binary packages to the container 210. The application binaries monitoring script 340 may be configured to log the binary packages that have been added or removed from the container 210 in a list stored in a file on an external volume of a host system. External volume means that the data is stored outside of the container and persists irrespective of the container. For instance, if the container is deleted or moved from the host system, files on the external volume are not deleted. The application initiation script 330 may also initiate an application binaries restore script 350 that is configured to restore the binaries that have been added to the container 210 when the container 210 is moved to another host system, updated with a new version of the container 210, and/or is being re-installed due to a performance issue or for any other reason.

Figure 4:
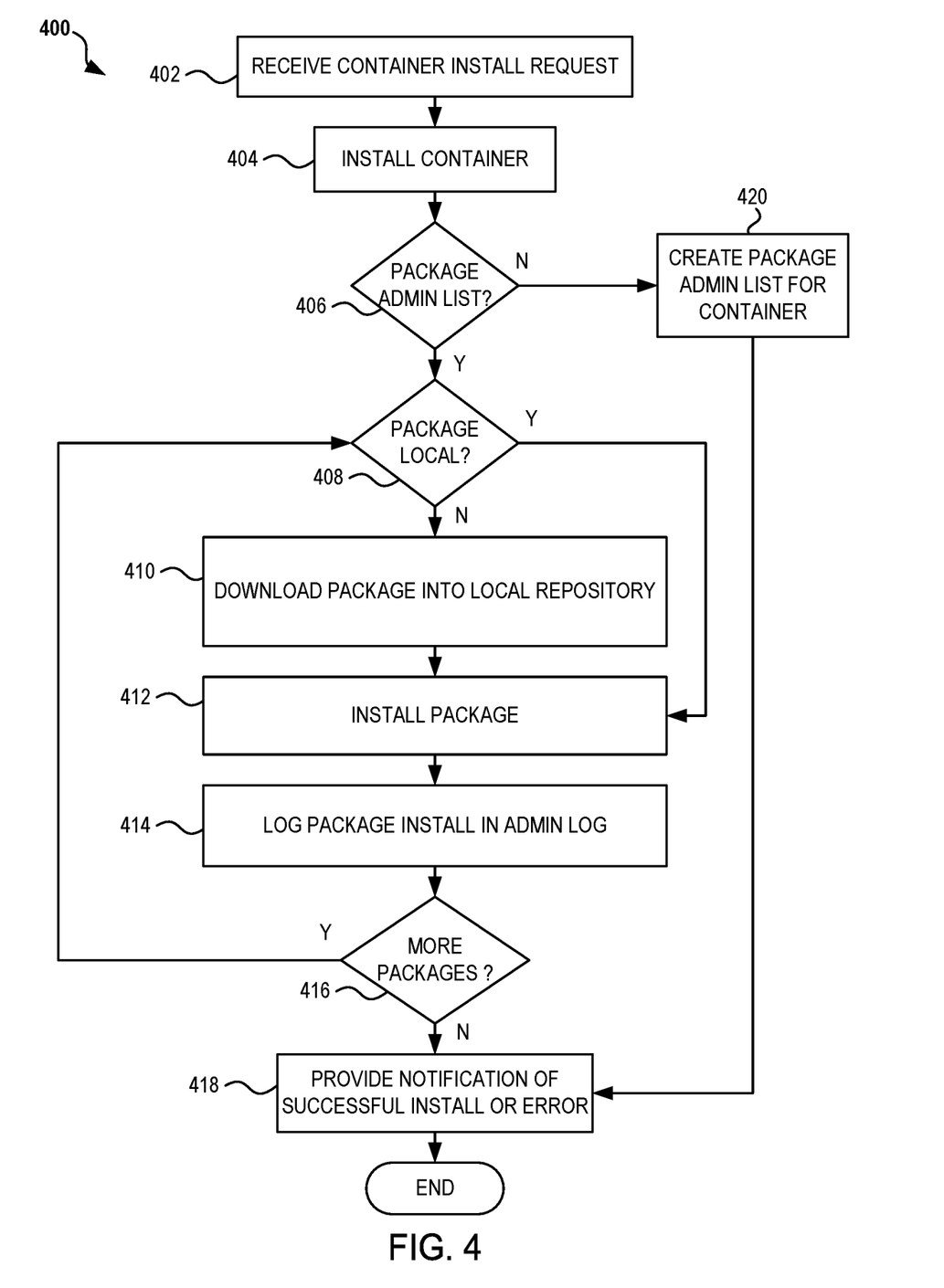
FIG. 4 is a flowchart of a computer-implemented method for restoring packages during a new container install according to an embodiment of the present disclosure.

FIG. 4 is a flowchart of a computer-implemented method 400 for restoring packages during a container install according to an embodiment of the present disclosure. The computer-implemented method 400 may be executed on a host system such as host system 120. The computer implemented method 400 begins at step 402 by receiving a container install request. The container install request may be initiated by a user or may be initiated by one or more processes executed on the host system or an external system such as orchestration system 110. At step 404, the computer implemented method 400 initiates installation of the container in response to the container install request.

In accordance with the disclosed embodiments, as part of the container install process, the computer implemented method 400 at step 406 determines if there is a package administrator list that contains a list of packages that were previously installed for this container. Although the present disclosure utilizes the terms "package" and "package administrator list", packages may be referred to by other names and the list of packages that were previously installed for this container may be referred to by any name. In one embodiment, the package administrator list is stored in a root-readable part of an external volume. Root-readable means that the root account of the operating system has access to the external volume and is able to read the file. The root account by default generally has access to all commands and files of an operating system. The package administrator list is stored on an external volume because data stored with the container does not persist when that container is no longer running, whereas data persist on the external volume irrespective of the condition of a container. The external volume may be created in the filesystem on a host system by the host container platform running on the host system.

If the computer implemented method 400 at step 406 determines that a package administrator list does not exist for the container, the computer implemented method 400 creates the package administrator list for the container at step 420. The computer implemented method 400 then proceeds to step 418 where it provides a user notification that the container was successfully installed or if an error was encountered, with the computer implemented method 400 terminating thereafter.

Returning to step 406, if the computer implemented method 400 determines that a package administrator list does exist for the container, the computer implemented method 400 at step 408 determines if the first package on the package administrator list is locally stored on a data storage of the host system, referred to herein as a local repository. If the computer implemented method 400 at step 408 determines that the first package is stored in a local repository, the computer implemented method 400 at step 412 initiates installation of the package from the local repository. If the computer implemented method 400 at step 408 determines that the first package is not in a local repository of the host system, the computer implemented method 400 at step 410 downloads the package from an external source and stores the package into a local repository of the host system.

At step 412, the computer implemented method 400 installs the package for the container. At step 414, the computer implemented method 400 logs the details of the package installation into an administrator log file. The administrator log file may include such information as, but not limited to, package identifier, container identifier, platform, version, time, date, installation fails/succeeds, error codes, and uninstallation commands.

At step 416, the computer implemented method 400 determines if there are additional packages to install with the container on the package administrator list. If the computer implemented method 400 determines that there are additional packages to install with the container on the package administrator list, the computer implemented method 400 returns to step 408 and repeats the package installation process (steps 408-414). If the computer implemented method 400 determines that there are no additional packages to install with the container on the package administrator list, the computer implemented method 400 proceeds to step 418.

At step 418, the computer implemented method 400 provides a notification of successful install or error if the installation failed, with the computer implemented method 400 terminating thereafter. The notification may be presented to a user or communicated to another entity or system that requested the container install. In certain embodiments, the notification may include one or more error codes if a part of a container or package fails installation.

Figure 5:
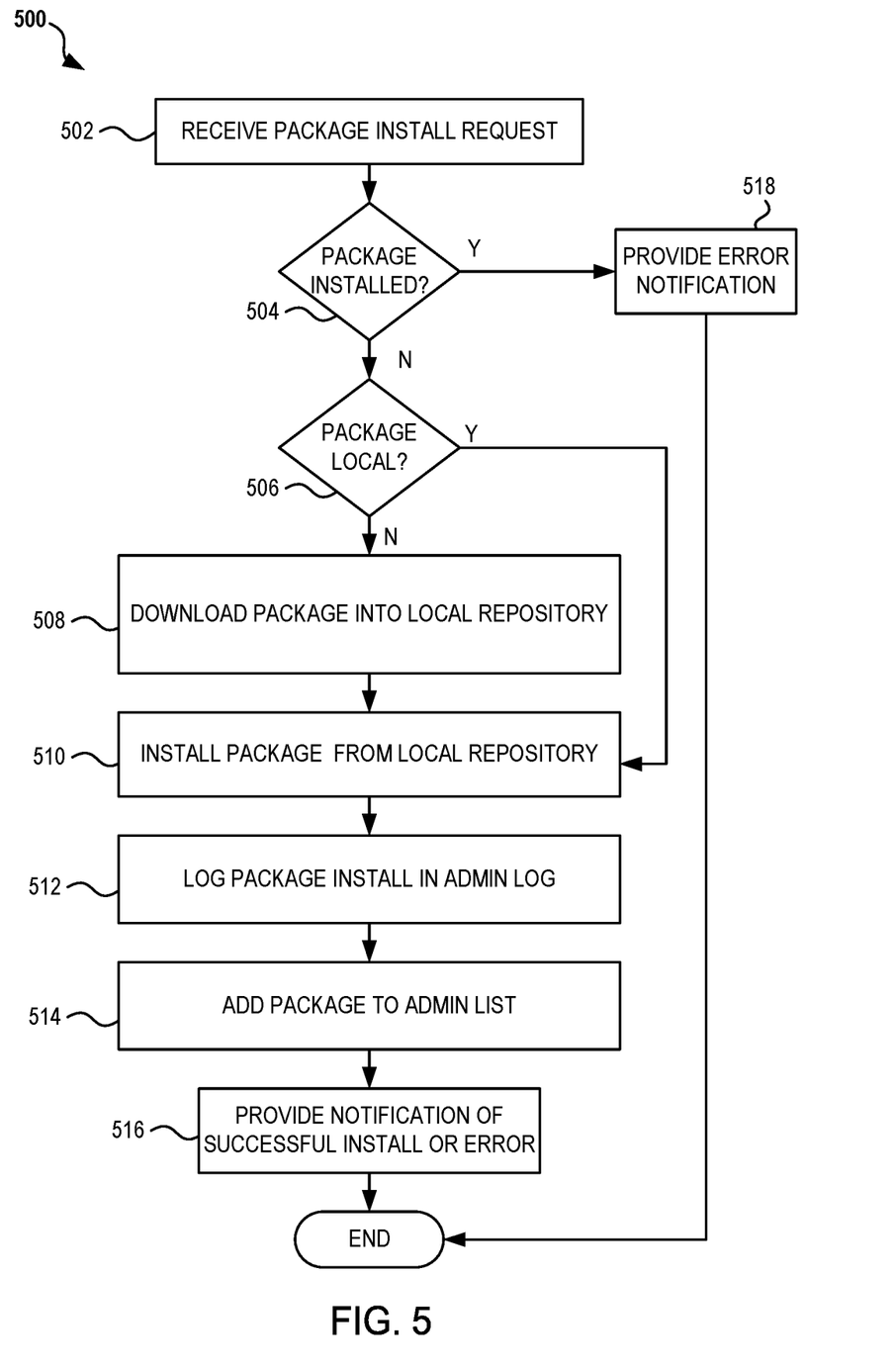
FIG. 5 is a flowchart of a computer-implemented method for installing packages of a container according to an embodiment of the present disclosure.

FIG. 5 is a flowchart of a computer-implemented method 500 for installing packages for a container according to an embodiment of the present disclosure. The computer-implemented method 500 may be executed on a host system such as host system 120. The computer implemented method 500 is executed after the container has already been installed or restored on the host system (e.g., using the computer implemented method 400). For example, once a container and its packages have been restored on a host system, a user may decide to add additional packages to the container by initiating the computer-implemented method 500.

The computer-implemented method 500 begins at step 502 by receiving a package install request to install a particular package for an installed container on the host system. At step 504, the computer-implemented method 500 determines if the requested package is already installed for the container. If the computer-implemented method 500 determines that the requested package is already installed for the container, the computer-implemented method 500 at step 518 provides an error notification to the user or system that requested the package install, with the computer implemented method 500 terminating thereafter.

Returning to step 504, if the computer-implemented method 500 determines that the requested package is not already installed for the container, the computer-implemented method 500 at step 506 determines if the package is stored in a local repository of the host system. If the computer-implemented method 500 at step 506 determines that the package is not stored in a local repository of the host system, the computer-implemented method 500 at step 508 downloads the package from an external source and stores the package in a local repository of the host system. Once the package is downloaded to a local repository of the host system, or if the computer-implemented method 500 at step 506 determines that the package is already stored in a local repository of the host system, the computer-implemented method 500 at step 510 installs the package using the copy stored in the local repository of the host system. At step 512, the computer-implemented method 500 logs details of the package installation in an administrator log file. At step 514, the computer-implemented method 500 adds the package to the package administrator list for the container. The computer-implemented method 500 at step 516 provides a notification of successful package install or error if the package installation failed, with the computer implemented method 500 terminating thereafter. The notification may be presented to a user or communicated to another entity or system that requested the package install. The notification may include one or more error codes indicating why a package failed to install.

Figure 6:
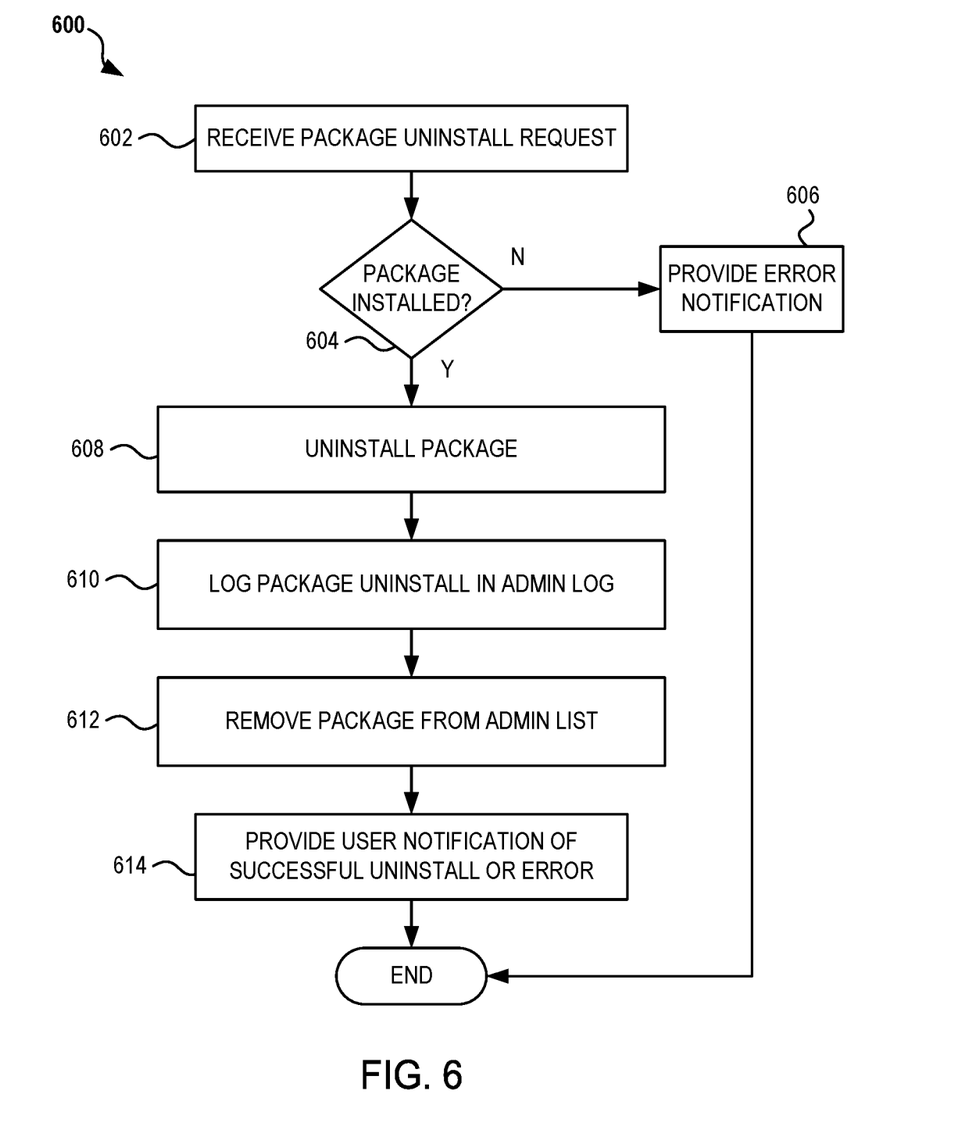
FIG. 6 is a flowchart of a computer-implemented method for un-installing packages of a container according to an embodiment of the present disclosure.

FIG. 6 is a flowchart of a computer-implemented method 600 for uninstalling packages of a container according to an embodiment of the present disclosure. The computer-implemented method 600 may be executed on a host system such as host system 120. The computer implemented method 600 is executed after the container has already been uninstalled or restored on the host system (e.g., using the computer implemented method 400). For example, once a container and its packages have been restored on a host system, or additional packages have been added to the container (e.g., using the computer implemented method 500), a user may decide to remove one or more packages of the container by initiating the computer-implemented method 600.

The computer-implemented method 600 begins at step 602 by receiving a package uninstall request to uninstall a particular package of a container on the host system. At step 604, the computer-implemented method 600 determines if the requested package is installed for the container. If the computer-implemented method 600 at step 604 determines that the requested package is not uninstalled for the container, the computer-implemented method 600 at step 606 provides an error notification to the user or system that requested the package uninstall to indicate that the requested package is not installed for the container, with the computer implemented method 600 terminating thereafter.

Returning to step 604, if the computer-implemented method 600 determines that the requested package is installed for the container, the computer-implemented method 600 at step 608 uninstalls the package from the container. At step 610, the computer-implemented method 600 logs details of the package uninstallation in an administrator log file. At step 612, the computer-implemented method 600 removes the package from the package administrator list for the container. The computer-implemented method 600 at step 614 provides a notification of successful package uninstall or error if the package uninstallation failed, with the computer implemented method 600 terminating thereafter. The notification may be presented to a user or communicated to another entity or system that requested the package uninstall. The notification may include one or more error codes indicating why a package failed to uninstall.

Figure 7:
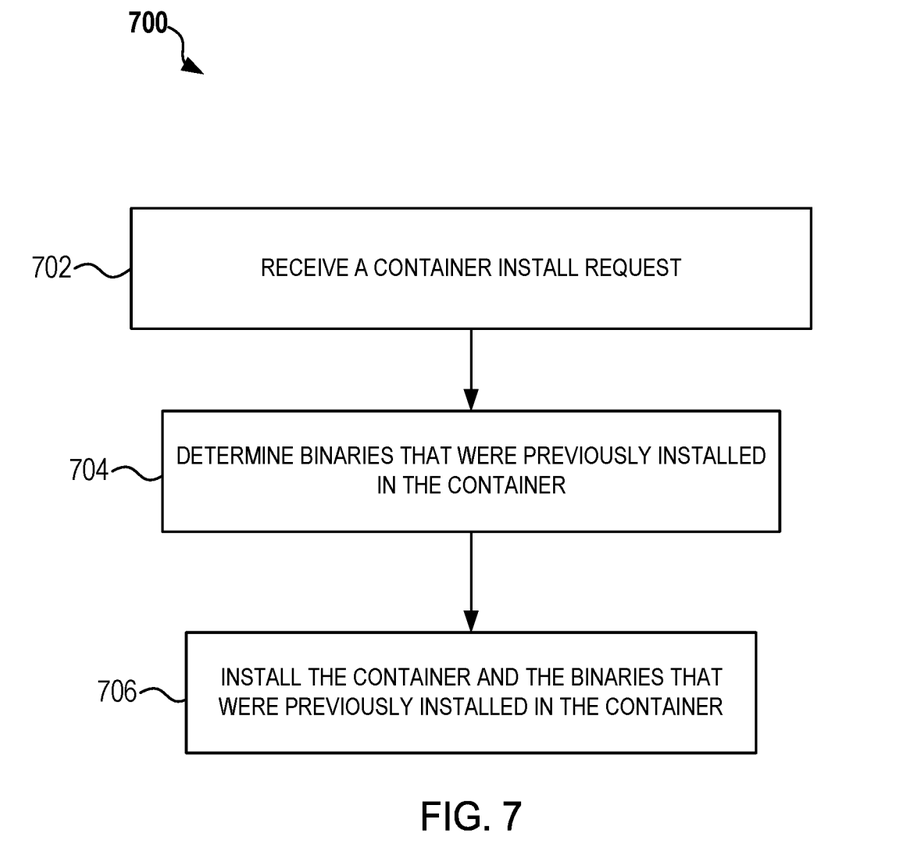
FIG. 7 is a flowchart of a computer-implemented method for restoring packages during a new container install according to an embodiment of the present disclosure.

FIG. 7 is a flowchart of a computer-implemented method 700 for restoring packages during a new container install according to an embodiment of the present disclosure. The computer-implemented method 700 at step 702 receives a container install request. The container install request may be initiated by a user or by another system such as, but not limited to, the orchestration system 110 in FIG. 1. For example, the orchestration system 110 may move a container to another host system or restore a container on a host system if it determines that the container is not functioning properly. Alternatively, a user may decide to add a particular container or restore a container on a host system.

In response to receiving the container install request, the computer-implemented method 700 at step 704 determines binaries that were previously installed with the container. In one embodiment, a file containing a list of the binaries that were previously installed with the container is stored in an external volume of the host system. An external volume means memory that is external to the container and persists beyond the life of the container.

The computer-implemented method 700 at step 706 installs the container and the binaries that were previously installed with the container in response to the container install request, with the computer-implemented method 700 terminating thereafter. In one embodiment, the binaries are restored using locally stored copies in a local repository of the host system. This expedites the container restoration process, ensures that binaries are available, and avoids run-time network dependencies/failures. In one embodiment, if a binary is not available locally, the computer-implemented method 700 attempts to download the binary and if successful, stores the binary in a local repository of the host system for future installations. In one embodiment, installation details of the binaries that are installed with the container may also be stored in a log file in the external volume.

Figure 8:
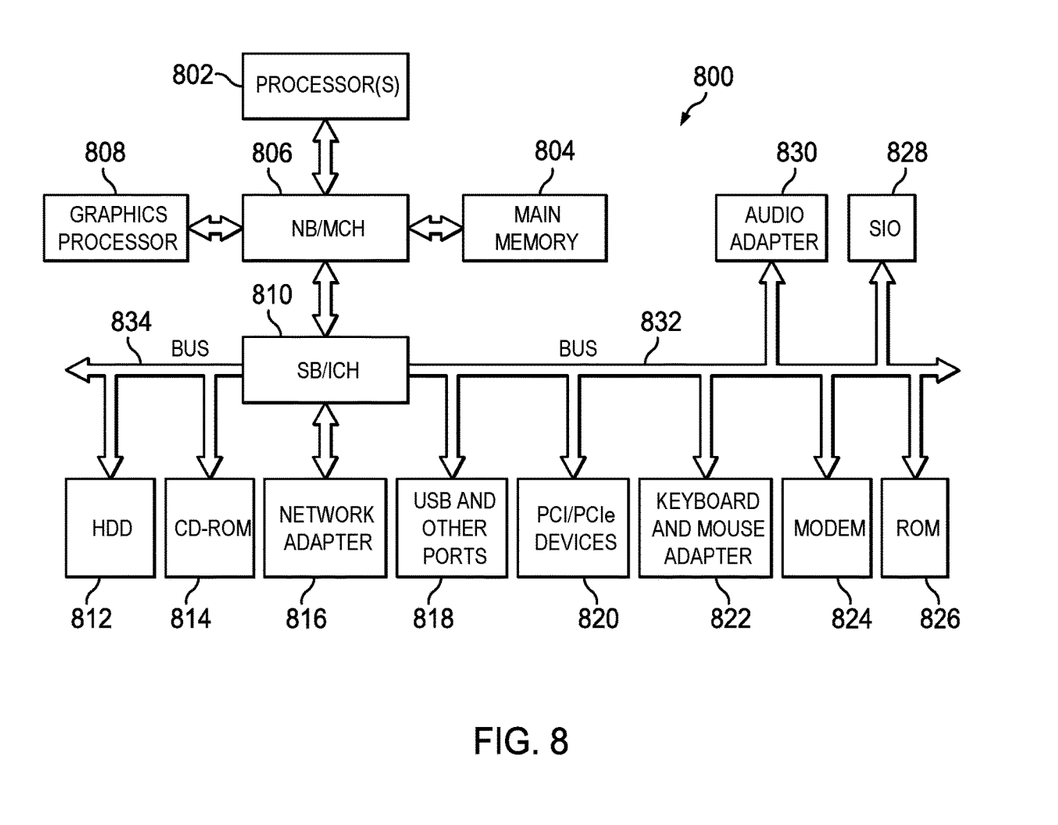
FIG. 8 is a block diagram illustrating a hardware architecture of a system according to an embodiment of the present disclosure.

FIG. 8 is a block diagram illustrating a hardware architecture of a system 800 according to an embodiment of the present disclosure in which aspects of the illustrative embodiments may be implemented. For example, in one embodiment, the host system 120 and/or the orchestration system 110 may be implemented using the data processing system 800. In the depicted example, the data processing system 800 employs a hub architecture including north bridge and memory controller hub (NB/MCH) 806 and south bridge and input/output (I/O) controller hub (SB/ICH) 810. Processor(s) 802, main memory 804, and graphics processor 808 are connected to NB/MCH 806. Graphics processor 808 may be connected to NB/MCH 806 through an accelerated graphics port (AGP). A computer bus, such as bus 832 or bus 834, may be implemented using any type of communication fabric or architecture that provides for a transfer of data between different components or devices attached to the fabric or architecture.

In the depicted example, network adapter 816 connects to SB/ICH 810. Audio adapter 830, keyboard and mouse adapter 822, modem 824, read-only memory (ROM) 826, hard disk drive (HDD) 812, compact disk read-only memory (CD-ROM) drive 814, universal serial bus (USB) ports and other communication ports 818, and peripheral component interconnect/peripheral component interconnect express (PCI/PCIe) devices 820 connect to SB/ICH 810 through bus 832 and bus 834. PCI/PCIe devices may include, for example, Ethernet adapters, add-in cards, and PC cards for notebook computers. PCI uses a card bus controller, while PCIe does not. ROM 826 may be, for example, a flash basic input/output system (BIOS). Modem 824 or network adapter 816 may be used to transmit and receive data over a network.

HDD 812 and CD-ROM drive 814 connect to SB/ICH 810 through bus 834. HDD 812 and CD-ROM drive 814 may use, for example, an integrated drive electronics (IDE) or serial advanced technology attachment (SATA) interface. In some embodiments, HDD 812 may be replaced by other forms of data storage devices including, but not limited to, solid-state drives (SSDs). A super I/O (SIO) device 828 may be connected to SB/ICH 810. SIO device 828 may be a chip on the motherboard that is configured to assist in performing less demanding controller functions for the SB/ICH 810 such as controlling a printer port, controlling a fan, and/or controlling the small light emitting diodes (LEDS) of the data processing system 800.

The data processing system 800 may include a single processor 802 or may include a plurality of processors 802. Additionally, processor(s) 802 may have multiple cores. For example, in one embodiment, data processing system 800 may employ a large number of processors 802 that include hundreds or thousands of processor cores. In some embodiments, the processors 802 may be configured to perform a set of coordinated computations in parallel.

An operating system is executed on the data processing system 800 using the processor(s) 802. The operating system coordinates and provides control of various components within the data processing system 800 in FIG. 4. Various applications and services may run in conjunction with the operating system. Instructions for the operating system, applications, and other data are located on storage devices, such as one or more HDD 812, and may be loaded into main memory 804 for execution by processor(s) 802. In some embodiments, additional instructions or data may be stored on one or more external devices. The processes described herein for the illustrative embodiments may be performed by processor(s) 802 using computer usable program code, which may be located in a memory such as, for example, main memory 804, ROM 826, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method performed for restoring binaries of a container, the computer-implemented method comprising:
   receiving a container install request to install a container on a host system, the container comprising an application packaged with all its dependencies;
   determining binaries that were previously installed with the container, wherein the binaries add custom functions to the container; and
   installing the container and the binaries that were previously installed with the container in response to the container install request.

2. The computer-implemented method of claim 1, wherein a list of the binaries that were previously installed with the container is stored in an external volume of the host system.

3. The computer-implemented method of claim 1, further comprising logging installation details of the binaries that are installed with the container in a log.

4. The computer-implemented method of claim 1, wherein installing the binaries that were previously installed with the container comprises:
   determining whether a package containing the binaries is stored in a local repository of the host system; and
   responsive to a determination that the package is stored in the local repository of the host system, installing the package using the package stored in the local repository of the host system.

5. The computer-implemented method of claim 4, further comprising:
   responsive to a determination that the package is not stored in the local repository of the host system, downloading the package from an external repository; and
   installing the package using the downloaded package.

6. The computer-implemented method of claim 5, further comprising storing the downloaded package in the local repository of the host system.

7. The computer-implemented method of claim 1, further comprising:
   receiving a package uninstall request to uninstall a package after the container has been installed on the host system;
   uninstalling the package from the container;
   removing the package from a list of the binaries that are installed with the container; and
   logging uninstall details of the package in a log.

8. The computer-implemented method of claim 1, further comprising:
   receiving a package install request to install a package after the container has been installed on the host system;
   installing the package with the container;
   adding the package to a list of the binaries that are installed with the container; and
   logging installation details of the package in a log.

9. The computer-implemented method of claim 8, further comprising:
   determining whether the package is stored in a local repository of the host system;
   responsive to a determination that the package is stored in the local repository of the host system, installing the package using the package stored in the local repository of the host system;
   responsive to a determination that the package is not stored in the local repository of the host system, downloading the package from an external repository;

installing the package using the downloaded package; and
storing the downloaded package in the local repository of the host system.

10. A system configured to restore binaries of a container, the system comprising memory for storing instructions, and a processor configured to execute the instructions to:
   receive a container install request to install a container on a host system, the container comprising an application packaged with all its dependencies;
   determine binaries that were previously installed with the container, wherein the binaries add custom functions to the container; and
   install the container and the binaries that were previously installed with the container in response to the container install request.

11. The system of claim 10, wherein the processor further executes instructions to:
   determine whether a package containing the binaries is stored in a local repository of the host system; and
   install the package using the package stored in the local repository of the host system in response to a determination that the package is stored in the local repository of the host system.

12. The system of claim 10, wherein the processor further executes instructions to:
   determine whether a package containing the binaries is stored in a local repository of the host system;
   download the package from an external repository in response to a determination that the package is not stored in the local repository of the host system;
   install the package using the downloaded package; and
   store the downloaded package in the local repository of the host system.

13. The system of claim 10, wherein the processor further executes instructions to:
   receive a package install request to install a package after the container has been installed on the host system;
   install the package with the container;
   add the package to a list of the binaries that are installed with the container; and
   log installation details of the package in a log.

14. The system of claim 10, wherein the processor further executes instructions to:
   receive a package uninstall request to uninstall a package after the container has been installed on the host system;
   uninstall the package with the container;
   remove the package from a list of the binaries that are installed with the container; and
   log uninstall details of the package in a log.

15. The system of claim 10, wherein the processor further executes instructions to provide a notification that the container and the binaries that were previously installed with the container have been successfully restored.

16. A computer program product for restoring binaries of a container, the computer program product comprising a computer readable storage medium having program instructions embodied therewith, the program instructions executable by a processor to:
   receive a container install request to install a container on a host system, the container comprising an application packaged with all its dependencies;
   determine binaries that were previously installed with the container, wherein the binaries add custom functions to the container; and
   install the container and the binaries that were previously installed with the container in response to the container install request.

17. The computer program product of claim 16, the program instructions further executable by the processor to:
   determine whether a package containing the binaries is stored in a local repository of the host system; and
   install the package using the package stored in the local repository of the host system in response to a determination that the package is stored in the local repository of the host system.

18. The computer program product of claim 16, the program instructions further executable by the processor to:
   determine whether a package containing the binaries is stored in a local repository of the host system;
   download the package from an external repository in response to a determination that the package is not stored in the local repository of the host system;
   install the package using the downloaded package; and
   store the downloaded package in the local repository of the host system.

19. The computer program product of claim 16, the program instructions further executable by the processor to:
   receive a package install request to install a package after the container has been installed on the host system;
   install the package with the container;
   add the package to a list of the binaries that are installed with the container; and
   log installation details of the package in a log.

20. The computer program product of claim 16, the program instructions further executable by the processor to:
   receive a package uninstall request to uninstall a package after the container has been installed on the host system;
   uninstall the package with the container;
   remove the package from a list of the binaries that are installed with the container; and
   log uninstall details of the package in a log.

* * * * *